(12) United States Patent
Rhoads

(10) Patent No.: US 9,122,804 B2
(45) Date of Patent: Sep. 1, 2015

(54) LOGIC VALIDATION AND DEPLOYMENT

(71) Applicant: ORACLE INTERNATIONAL CORPORATION, Redwood Shores, CA (US)

(72) Inventor: Mark Rhoads, Bozeman, MT (US)

(73) Assignee: Oracle Internation Corporation, Redwood Shores, CA (US)

( * ) Notice: Subject to any disclaimer, the term of this patent is extended or adjusted under 35 U.S.C. 154(b) by 204 days.

(21) Appl. No.: 13/895,183

(22) Filed: May 15, 2013

(65) Prior Publication Data

US 2014/0344788 A1 Nov. 20, 2014

(51) Int. Cl.
*G06F 9/44* (2006.01)
*G06F 11/36* (2006.01)
*G06F 9/445* (2006.01)
*G06F 9/455* (2006.01)

(52) U.S. Cl.
CPC .............. *G06F 11/3692* (2013.01); *G06F 8/60* (2013.01); *G06F 8/71* (2013.01); *G06F 9/45508* (2013.01)

(58) Field of Classification Search
CPC ... G06F 11/3692; G06F 9/45508; G06F 8/60; G06F 8/71; G06F 8/61
See application file for complete search history.

(56) References Cited

U.S. PATENT DOCUMENTS 7,996,347 B2 * 8/2011 Hutson et al. .................... 706/45
8,359,580 B2 * 1/2013 Gonzales et al. ............. 717/128
8,572,576 B2 * 10/2013 Elvanoglu et al. ............. 717/127
8,612,582 B2 * 12/2013 Dare et al. .................... 709/224
8,745,585 B2 * 6/2014 Watters et al. ................ 717/121
8,918,513 B2 * 12/2014 Vendrow ....................... 709/226
8,954,309 B2 * 2/2015 B'Far et al. ..................... 703/21
9,009,683 B2 * 4/2015 Siddalingesh ................ 717/135
2007/0240127 A1 * 10/2007 Roques et al. ................ 717/136
2008/0313596 A1 * 12/2008 Kreamer et al. .............. 717/101
2013/0167107 A1 * 6/2013 Goyal et al. .................. 717/101

OTHER PUBLICATIONS

Galuba et al., ProtoPeer: a P2P toolkit bridging the gap between simulation and live deployement, Mar. 2009, 9 pages.*
J. Manweiler, Cloud-based mobile augmented reality, pitfalls and strategies in a realtime deployment, Jun. 2014, 1 page.*
Hahn et al., Using virtualization and live migration in a scalable mobile wireless testbed, Dec. 1010, 5 pages.*
Schommer et al., Evaluation of the real-time Java runtime environment for deployment in time-critical systems, Sep. 2009, 10 pages.*

* cited by examiner

*Primary Examiner* — Thuy Dao
(74) *Attorney, Agent, or Firm* — Kilpatrick Townsend & Stockton LLP

(57) ABSTRACT

A method of implementing and validating business logic may include translating the business logic into an executable routine, and providing the executable routine to a logic interpreter. The logic interpreter may be configured to receive inputs from the user interface during live use, process the inputs according to the executable routine to generate a result set, and provide the result set to a database for storage. The method may also include receiving a test harness comprising a plurality of input sets and a corresponding plurality of expected result sets, and processing each of the plurality of input sets according to the executable routine to generate a plurality of result sets. The method may additionally include generating an automatic determination as to whether the executable routine should be deployed for live use based on the plurality of result sets and the plurality of expected result sets.

20 Claims, 7 Drawing Sheets

LOGIC VALIDATION AND DEPLOYMENT

BACKGROUND

Managing large businesses may involve storing, aggregating, and analyzing large amounts of data. Many organizations use Enterprise Software Systems to manage almost every form of business data. For example, Enterprise Software Systems can provide business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and Enterprise forms automation.

BRIEF SUMMARY

In one embodiment, a method of implementing and validating business logic in an Enterprise Software System for deployment may be presented. The method may include receiving the business logic comprising functional algorithms that define one or more information exchanges between a database and a user interface. The method may also include translating the business logic into an executable routine, and providing the executable routine to a logic interpreter. The logic interpreter may be configured to receive inputs from the user interface during live use, process the inputs according to the executable routine to generate a result set, and provide the result set to the database for storage. The method may additionally include receiving a test harness comprising a plurality of input sets and a corresponding plurality of expected result sets, and processing each of the plurality of input sets according to the executable routine to generate a plurality of result sets. The method may further include generating an automatic determination as to whether the executable routine should be deployed for live use based on the plurality of result sets and the plurality of expected result sets.

In some embodiments, the method may also include receiving an administrator input authorizing the executable routine to be deployed for live use, and deploying the executable routine for live use based on both the administrator input and the automatic determination. The method may additionally include deploying the executable routine, monitoring the performance of the executable routine, and disabling the executable routine if a set of failure criteria are met. The set of failure criteria may include a threshold number of detected failures within a predetermined time interval. The method may further include converting the business logic to a directed graph before the business logic is converted into the executable routine, and detecting a cycle in the directed graph and displaying the cycle in the context of the directed graph through a display device. The business logic interpreter may be implemented on a computer system that is physically distinct from the database and the user interface. The Enterprise Software System may be designed by a first entity, the Enterprise Software System may be operated by a second entity, and the business logic may be provided by the second entity.

In another embodiment, a computer-readable memory may be presented. The computer-readable memory may comprise a sequence of instructions which, when executed by one or more processors, causes the one or more processors to implement and validate business logic in an Enterprise Software System for deployment. The instructions may cause the processor(s) to receive the business logic comprising functional algorithms that define one or more information exchanges between a database and a user interface. The instructions may also cause the processor(s) to translate the business logic into an executable routine, and provide the executable routine to a logic interpreter. The logic interpreter may be configured to receive inputs from the user interface during live use, process the inputs according to the executable routine to generate a result set, and provide the result set to the database for storage. The instructions may additionally cause the processor(s) to receive a test harness comprising a plurality of input sets and a corresponding plurality of expected result sets, and to process each of the plurality of input sets according to the executable routine to generate a plurality of result sets. The instructions may further cause the processor(s) to generate an automatic determination as to whether the executable routine should be deployed for live use based on the plurality of result sets and the plurality of expected result sets.

In yet another embodiment, a system may be presented. The system may include one or more processors and a memory communicatively coupled with and readable by the one or more processors. The memory may comprise a sequence of instructions which, when executed by the one or more processors, cause the one or more processors to implement and validate business logic in an Enterprise Software System for deployment. The instructions may cause the processor(s) to receive the business logic comprising functional algorithms that define one or more information exchanges between a database and a user interface. The instructions may also cause the processor(s) to translate the business logic into an executable routine, and provide the executable routine to a logic interpreter. The logic interpreter may be configured to receive inputs from the user interface during live use, process the inputs according to the executable routine to generate a result set, and provide the result set to the database for storage. The instructions may additionally cause the processor(s) to receive a test harness comprising a plurality of input sets and a corresponding plurality of expected result sets, and to process each of the plurality of input sets according to the executable routine to generate a plurality of result sets. The instructions may further cause the processor(s) to generate an automatic determination as to whether the executable routine should be deployed for live use based on the plurality of result sets and the plurality of expected result sets.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
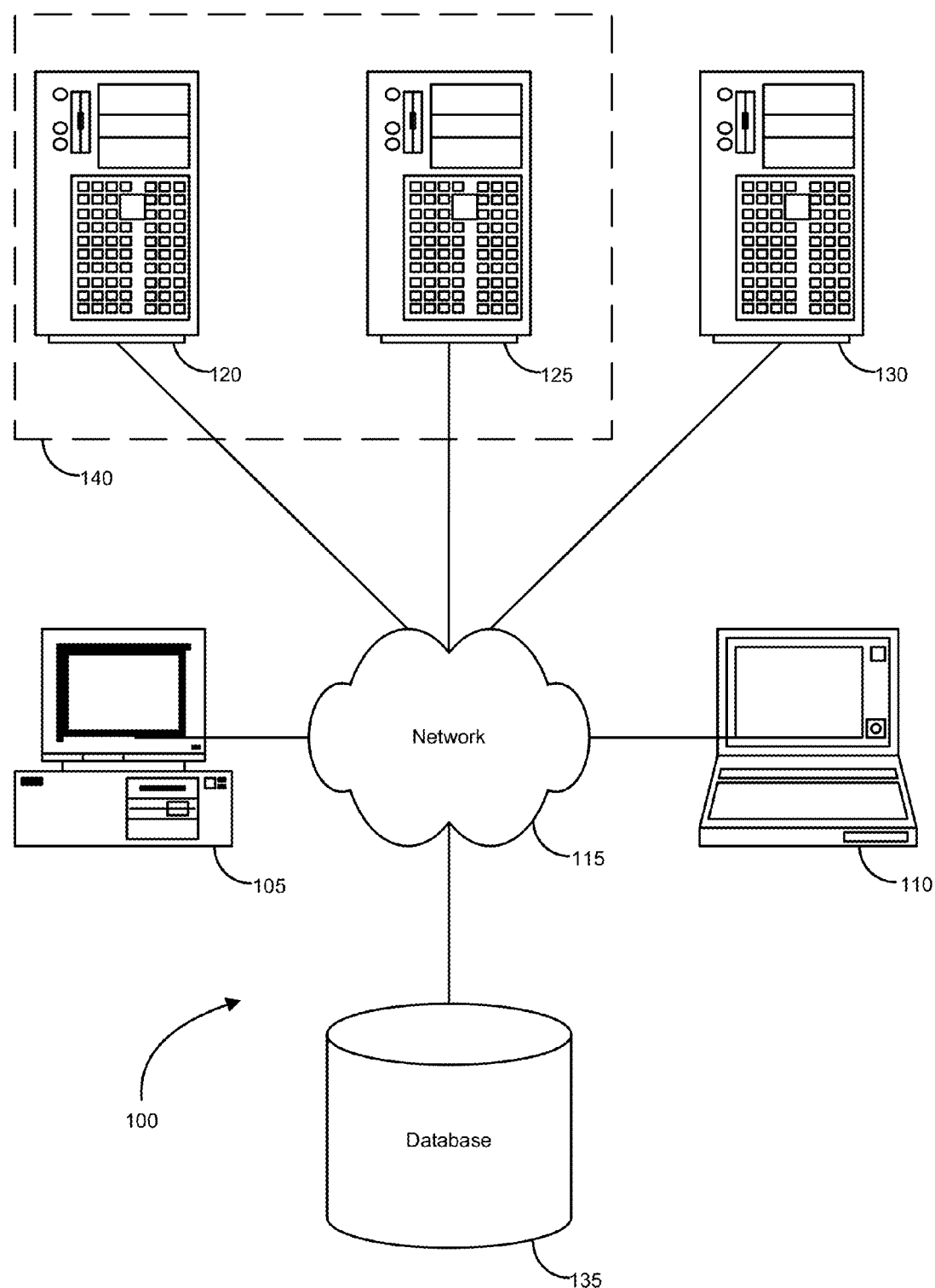
FIG. 1 illustrates a block diagram of components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Each of the embodiments disclosed herein may be implemented in a general-purpose computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
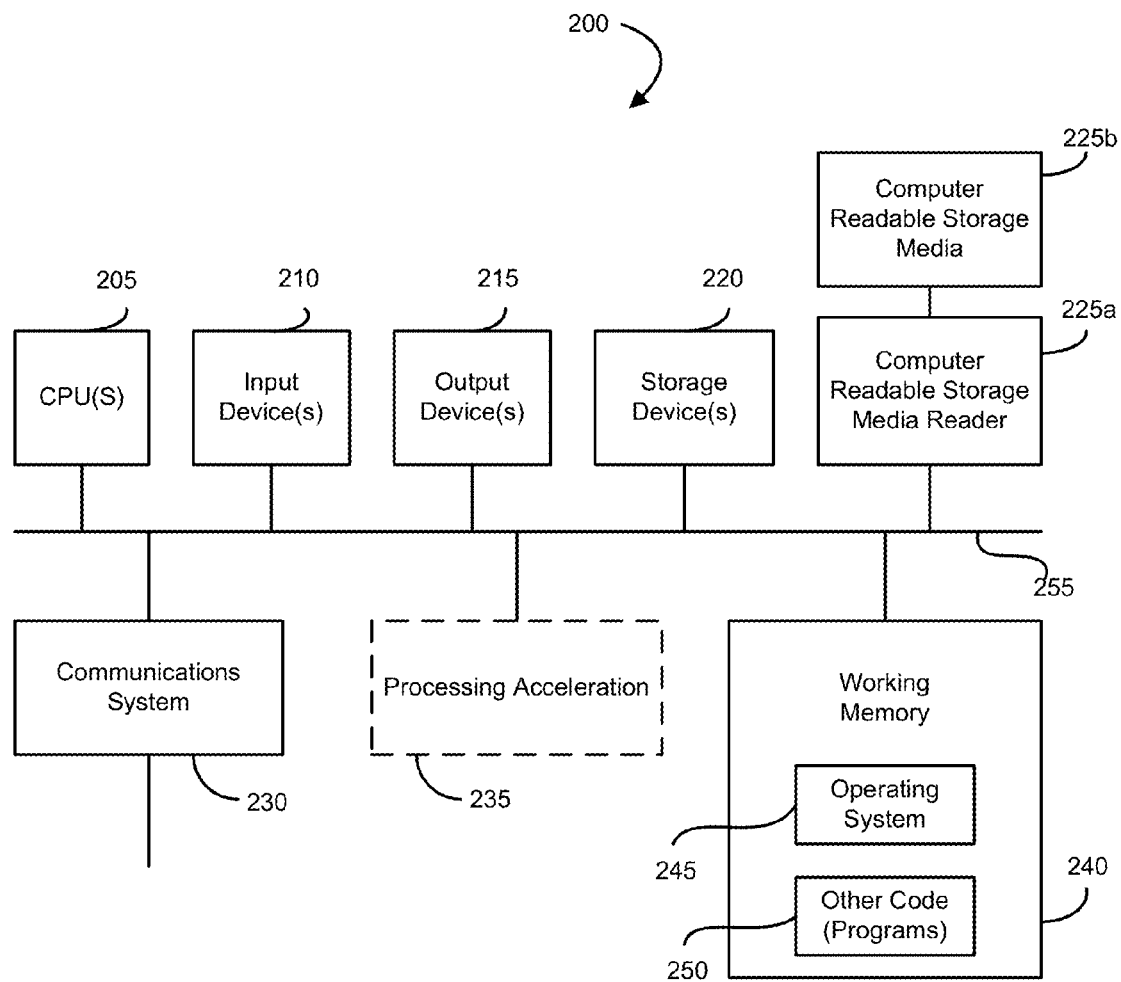
FIG. 2 illustrates a block diagram of an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225*a*, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225*a* can further be connected to a computer-readable storage medium 225*b*, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Each of the methods described herein may be implemented by a computer system, such as computer system 200 in FIG. 2. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computed without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

Described herein, are embodiments for creating, executing, validating, and/or monitoring business logic implementations in enterprise software system (ESS) databases that are deployed to a customer. Generally, ESS products are provided to customers in a functional form. Customers are allowed to make minor modifications that may include additional routines to be carried out on data stored in the database. However, by allowing customers to make their own changes to the ESS product, the performance of the product may be put at risk. Customers are generally not as well-versed in the internal workings of the ESS product as the original developers. Customers tend to provide routines that are not thoroughly tested and may result in system or data instability.

As described herein, some embodiments allow a customer to generate and represent business logic using a graphical interface. This interface may allow customers to define business logic as a directed graph, a flowchart, or some other graphical representation. The graphical interface may be combined with text-based commands to form an overall representation of the business logic. The ESS system may then translate the business logic into an executable routine. This read-only file generally need not require any kind of data/pointer resolutions, and thus can take advantage of memory-mapped operating system behavior. The executable routine can then be executed by a business logic interpreter. The business logic interpreter may receive inputs from a user interface or from a test harness that are processed using the executable routine. The test harness may include a set of expected results that can be compared to the actual results, and an automatic determination that can be made as to whether the executable routine is ready for live deployment. Some embodiments may also require a manual input from an customer's administrator also approving the executable routine for deployment and live use.

After the business logic represented by the executable routine is deployed for live use, the system may continue to monitor the operation of the executable routine to detect faults, failures, exceptions, crashes, incorrect data calculations, and/or the like. The number and severity of faults that will be tolerated by the ESS may be configured by the customer or by the original developer. If the number or severity of faults exceeds a threshold, the executable routine may be disabled for future use. Snapshots of the inputs and/or the information from an error log may be provided to the customer such that the executable routine may be revised, refined, revalidated, and once again deployed for live use.

The systems and methods described above may prevent customers from unknowingly corrupting their database or providing faulty business logic routines that slow down the processing of large data batches. When customers experience difficulties with their own implemented business logic, they commonly assume that the problem is associated with the ESS product. The customers then often call the ESS provider for help resolving the failure. The embodiments described herein not only ensure that the customer-implemented business logic meets a certain level of reliability prior to deployment, they also help customers pinpoint the source of the failures related to their business logic.

It may be particularly important to limit the number of failures tolerated after deployment. Typically, database operations each day may exceed millions of transactions. A single business logic routine that causes faults and/or delays may result in an unacceptable processing bottleneck if repeatedly executed. The embodiments described herein limit the damage that a faulty business logic routine may inflict upon the customer's data sets and/or operations.

Figure 3:
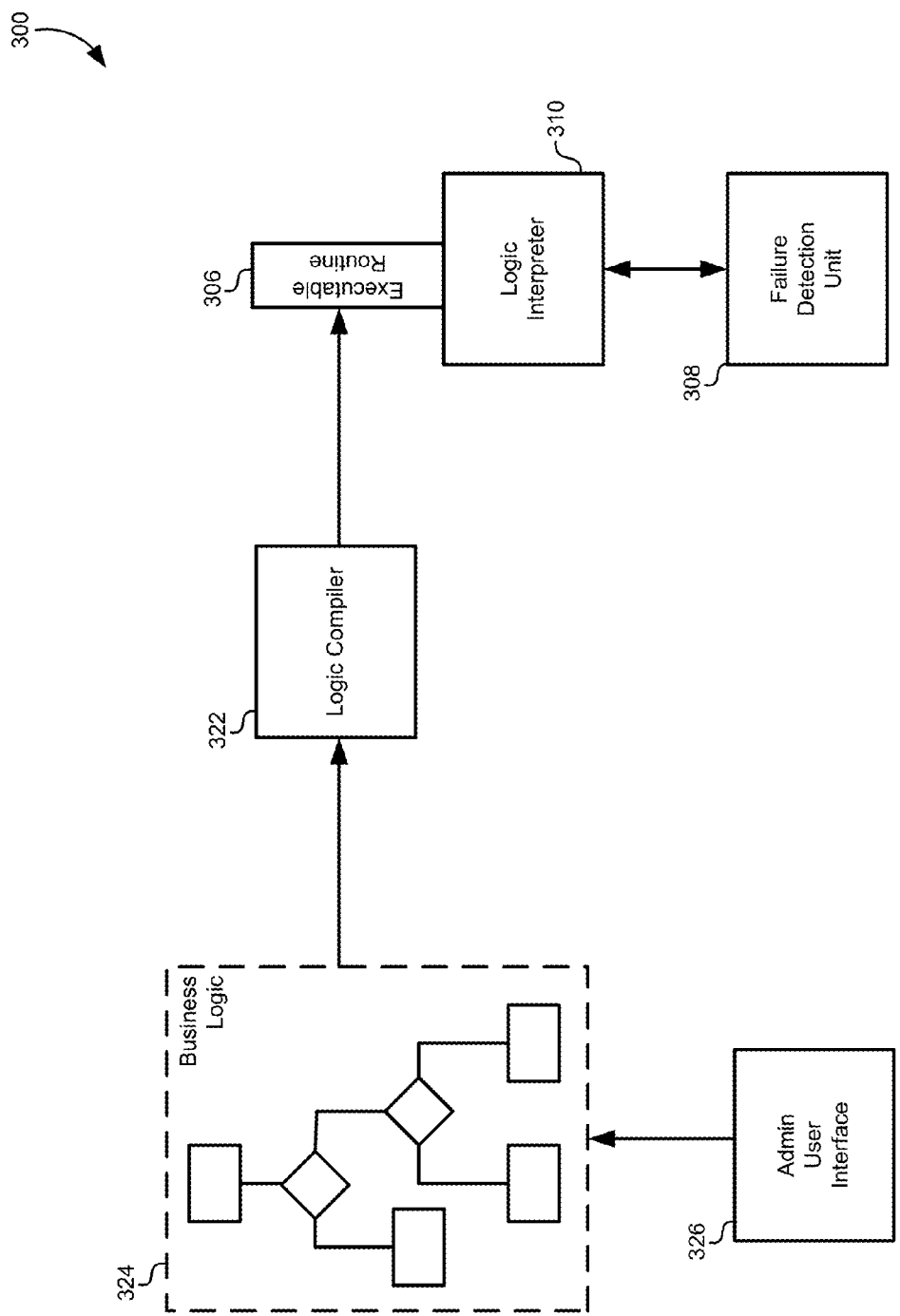
FIG. 3 illustrates a block diagram of a system for creating business logic, according to one embodiment.

FIG. 3 illustrates a block diagram 300 of a system for creating business logic, according to one embodiment. The system includes a user interface 326. The user interface 326 may be deployed as part of an administrator workstation. The user interface may be configured to provide a graphical environment in which business logic operations may be provided by the administrator. The business logic 324 may be provided in the form of a flowchart as depicted by FIG. 3. The business logic 324 may also be provided in the form of written scripts using common scripting languages. For example, the business logic 324 may be provided in the form of SQL statements and other logical/textual operations. Some embodiments may allow for the combination of graphical elements and textual elements in defining the business logic 324.

Some embodiments may utiltize a process designer that is configured to simplify the process of designing business logic 324. The process designer may provide system constants, commonly used functions, and/or data manipulations that can be easily inserted into business logic 324 by a user.

As described herein, business logic may include functional algorithms that define one or more information exchanges between a database and a user interface. Business logic may define operations to be performed on data before it is stored in the database. Business logic may also analyze data to determine how and where in the database certain portions of the inputs should be stored. For example, business logic may be used to assign portions of an overall overhead expense of a company to various divisions based on square footage, employee count, revenues, and/or the like.

In some embodiments, the system for creating business logic may be part of a customer service system, such as the RightNow™ product commercially available from Oracle™ Corp. These customer service systems may be configured to quickly and effectively identify relevant content by interpreting an intent embodied in a customer question. Customer service systems may also allow for real-time chats or live help sessions by directing customers to qualified customer service agents. It may be a particularly important for customer service systems to analyze customer questions as they are received in order to quickly pinpoint a source of information that can resolve the problem.

In the context of a customer service system, business logic may be used to analyze the incoming customer service questions, group them according to common identified intent categories, and route questions to appropriate departments or knowledge bases in order to answer the customer questions as quickly as possible. The business logic may include operations or functional algorithms that classify customer queries and route them to particular data centers. The business logic may operate by identifying key words or phrases within the queries, identifying sources of the queries, establishing an intent associated with the queries, classifying the queries with a set of solutions based on the categorized intent, and/or the like. The business logic may also identify metadata associated with the queries, such as tags specified by a user. Him Although certain advantages may be realized by implementing the embodiments described herein in a customer service system as described above, it will be understood that this is merely one exemplary system and not meant to be limiting. Other systems may also use embodiments for validating and deploying business logic, including accounting systems, procurement systems, sales systems, invoice systems, inventory management systems, and/or the like.

Once the business logic 324 is defined at the user interface 326, a logic compiler 322 can be configured to translate the business logic into an executable routine. The logic compiler 322 may be configured similar to other programming language compilers. For example, the logic compiler 322 may generate byte code that is executable by a logic interpreter 310. In other embodiments, the logic compiler 322 may generate machine code that is directly executable by a processor. In either case, the output of the logic compiler 322 may be referred to herein as an executable routine 306. It should be noted that translating the business logic 324 into an executable routine 306 may significantly increase the speed with which the business logic 324 may be implemented and run, and may also significantly reduce the overhead with respect to processing power and memory usage required to operate the business logic 324 during live use.

The executable routine 306 may then be provided to the logic interpreter 310. The logic interpreter 310 may comprise a virtual machine operating on a processing system. Alternatively, the logic interpreter 310 may comprise a computing system executing machine code provided by the logic interpreter 322, depending on the particular embodiment. Logic interpreter 310 may be configured to execute a special type of read-only file that does not require data/pointer address resolution. Memory addresses used therein may be relative to the starting point within the executable routine 306. This feature may allow a single instance of the executable routine 306 to be run by the logic interpreter 310 for multiple transactions or processes. This may also allow the logic interpreter 310 to take advantage of memory-mapped operating systems, such as UNIX™. By not requiring data/pointer address resolution, the executable routine can be loaded into the address space of a running process. This may allow thousands of processes to use the same executable routine in the same address space of the memory-mapped system on which the processes are running Each of the processes may share the same executable routine, but each process could operate as though it had exclusive access to the executable routine.

In some embodiments, the logic compiler 322 may be configured to detect cycles in the business logic 324. In cases where the business logic 324 is distilled into a data structure representing a directed graph, it may be possible that cycles may be present in the directed graph. The cycles may not be readily apparent to the logic designer until the business logic 324 is transformed into a directed graph. If cycles or other types of endless loops are detected, the user interface 326 may display a graphical representation of the directed graph to show the errors in the business logic 324. In some embodiments, the system may take a business logic representation provided by the user, translate the representation into a directed graph, detect cycles within the directed graph, and display the cycles in the context of the directed graph to the user. Showing cycles within a directed graph can make business logic errors more apparent and understandable to a user when compared to viewing lines of code during traditional debugging.

After the business logic 324 has been distilled by the logic compiler 322 into an executable routine 306 for the logic interpreter 310, the validation process may begin. The validation process may use a failure detection unit 308 in order to detect times when the executable routine 306 generates a fault, failure, exception, or other type of operating error. The validation process may also use a test harness to validate the outputs of the executable routine 306 against an expected set of outputs.

Figure 4:
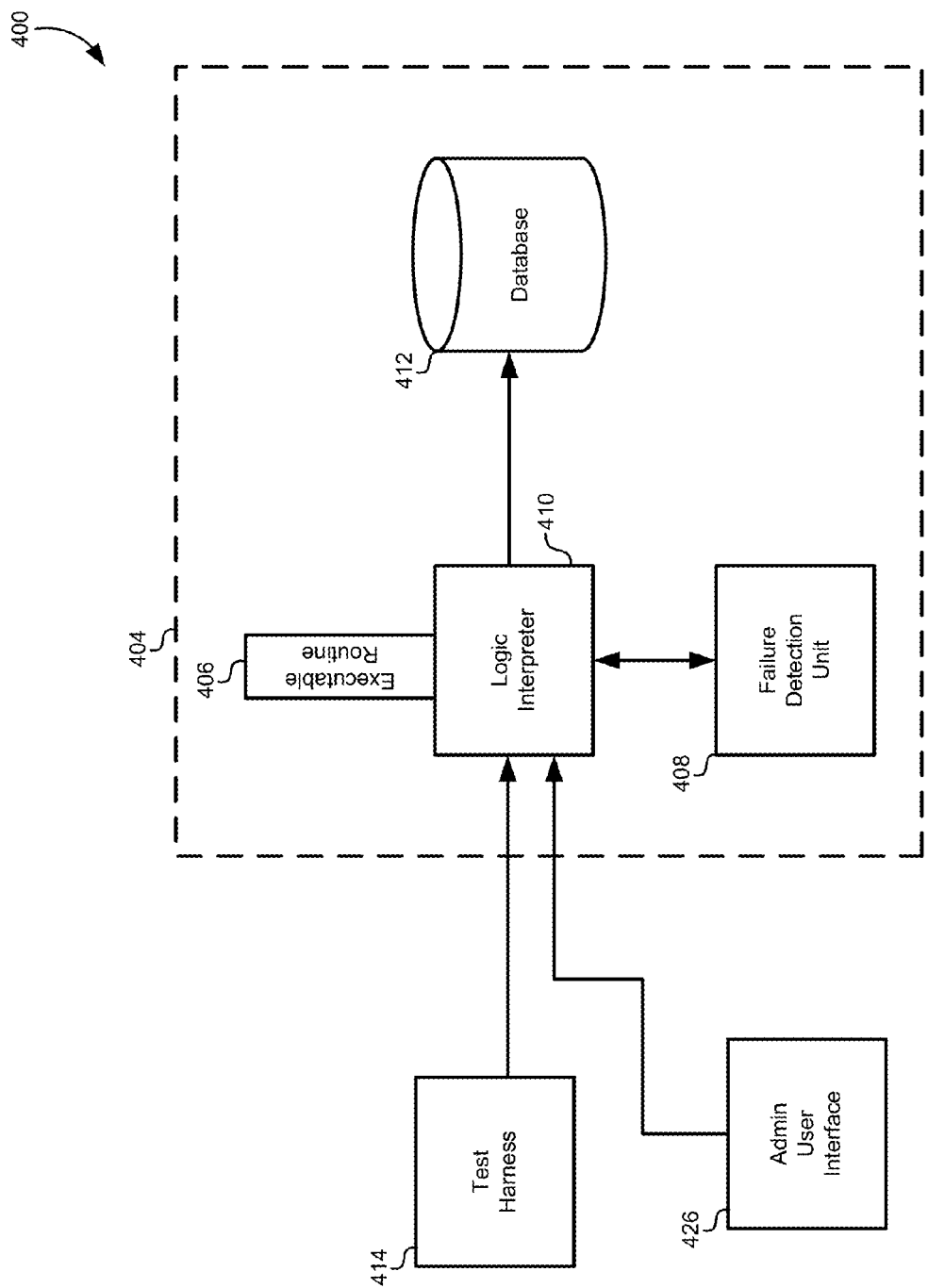
FIG. 4 illustrates a block diagram of a system for validating business logic, according to one embodiment.

FIG. 4 illustrates a block diagram 400 of a system for validating business logic, according to one embodiment. An executable routine 406, a logic interpreter 410, and/or a fault detection unit 408 may be similar to those described above in relation to FIG. 3. The test harness 414 may be configured to provide input sets to the logic interpreter 410. The input sets may include test data that is configured to execute and verify the various paths that may be taken within the business logic represented by the executable routine 406.

Generally, the logic interpreter 410 may be configured to receive inputs from a user interface during live use. However, the logic interpreter 410 may also be configured to receive inputs from the test harness 414. In some cases, the logic interpreter 410 may have two different operating modes: a test harness operating mode and a live use operating mode. The test harness operating mode may direct outputs to the test harness 414 rather than the database 412. There, the outputs may be compared to a set of expected results and validated.

In some embodiments, the logic interpreter 410 may be located in the CGI bin of a webpage. Thus, when a user interacts with the webpage, the code for the logic interpreter 410 will be readily available. The logic interpreter 410 may be a module that sits in front of the database 412 to intercept and pre-process data before it is stored in the database 412. For example, a web form may be provided on which users can enter queries, such as an indication that they are having trouble with a particular software widget. When submitting information from the web form, the logic interpreter 410 may execute the executable routine 406 to parse the input and direct information to correct locations within the database 412. From the user's perspective, they need not be aware that the logic interpreter 410 is in operation. It will be understood that the example of a web form is not meant to be limiting. This embodiment may operate with many different types of user inputs, such as consoles, integration APIs, mobile apps, and/or the like.

In some embodiments, user inputs may be processed by intermediate operations within the ESS product 404. For example, when the ESS product comprises a customer feedback system, the system may pre-process the user inputs to format the query appropriately into what may be referred to herein as an "incident object". The incident object may include data fields, methods, tags, and/or attributes that may be used by the logic interpreter 410 to process the user inputs. Therefore, some embodiments may reduce processing overhead by relying on a known data format at the input of the logic interpreter 410. In other types of systems, inputs may be pre-processed into formats such as a content object including media content, a contact object describing personal user information, and/or the like.

Alternatively, the logic interpreter 410 may operate in a single mode and receive inputs from the test harness 414 in the same way that inputs are received from a user interface during live use. The failure detection unit 408 may continue to detect operational failures that cause the executable routine 406 to stop executing before it is properly concluded. The outputs may be provided to a database 412. In some cases, the database 412 may be a production database that is also used during live use. In other cases, the database 412 may be a specialized test environment database that includes data similar to what would be found in a live use database. In this case, the test harness 414 may query the database for data rows that are then matched against expected result sets for validation.

In one embodiment, the executable routine 406, the logic interpreter 410, the failure detection unit 408, and/or the database 412 may be part of an ESS product 404. For example, the ESS product 404 may include a customer service product configured to receive, handle, and route customer queries in a customer service context. The test harness 414 may operate as a plug-in to the ESS product 404, such that the test harness 414 can be disconnected or otherwise disabled during live use.

At this point, an administrator of a customer may have developed business logic according to business rules for dealing with data inputs. The business logic may be automatically compiled into an executable routine 406 provided to a logic interpreter 410. The administrator may then provide an input directing the ESS product 404 to begin validating the executable routine 406 using a predetermined set of inputs and outputs. The validation process may monitor software failures as detected by the logic interpreter 410, as well as incorrect data transformations, calculations, and storage, as detected by the test harness against a set of expected results. If the validation process determines that the business logic has exceeded a threshold level score, the logic interpreter 410 may provide an indication that the executable routine 406 is ready for deployment and live use. This process provides a first level of protection against customer-defined business logic that may cause system failures and/or data corruption.

In addition to this automated process for validating the executable routine 406, the ESS product 404 may also receive a user input. The user input may be provided by a user interface 426 available on an administrator workstation. The user input may represent a subjective assessment that the executable routine 406 should be deployed for live use. After the system has indicated that the executable routine 406 did not surpass a failure threshold, actual results of the executable routine 406 execution may be provided to the user interface 426. The administrator may examine operating times, transaction results, failure causes, debugging information, and/or the like. From this, the administrator may determine whether the executable routine should be deployed for live use. Note that the system may determine that deployment is proper, while the administrator may override this determination and require further refinement of the business logic. The administrator input may represent a form of "two-person control" wherein both the system and the administrator must agree that deployment of the business logic is proper.

In some cases, the administrator input may be accepted from someone who bears the responsibility of verifying that the business logic worked correctly. In some cases, the administrator may face disciplinary action and/or pay decreases when process failures cause problems in the database 412. This added incentive may be used to increase the quality of business logic that is deployed to the ESS product 404.

As used herein, the term "deployed" may refer to the process by which an executable routine representing business logic is released for general use in the ESS product 404. Generally, once business logic is deployed it is no longer under the direct control of the administrator or logic designer. Instead, it may be put into widespread use throughout an organization by various users interacting with user interfaces configured to utilize the business logic. Therefore, deploying a faulty set of business logic may have widespread and dramatic effects on organizations' automated processes. By requiring both a computerized verification utilizing a test harness, along with a subjective verification by a human administrator, the quality of deployed business logic may be increased.

Figure 5:
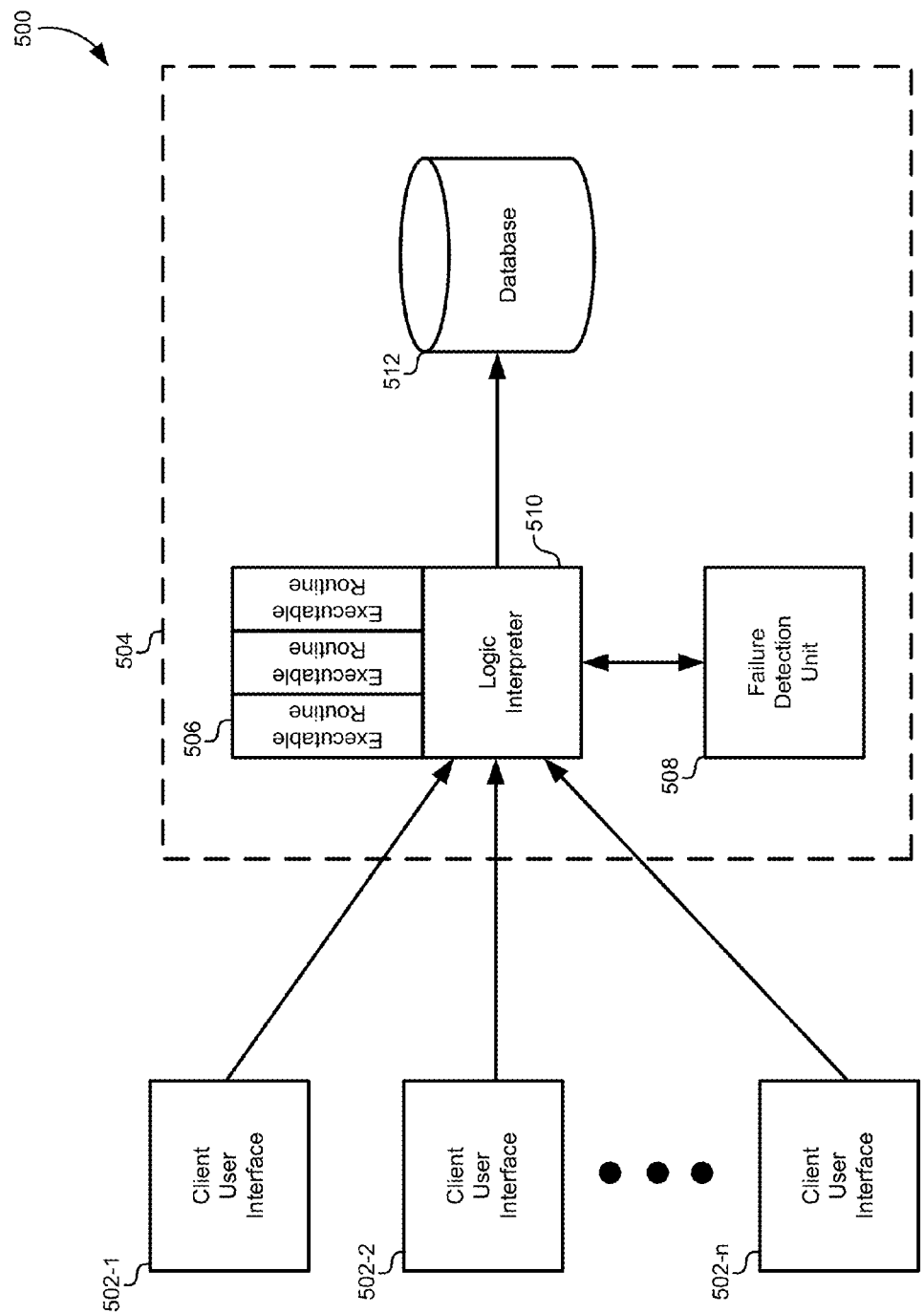
FIG. 5 illustrates a block diagram of a system for executing business logic, according to one embodiment.

FIG. 5 illustrates a block diagram 500 of a system for executing business logic, according to one embodiment. Block diagram 500 illustrates a system configuration wherein the executable routine 506 is been deployed for widespread use within an ESS product 504 throughout an organization. The logic interpreter 510 may be communicatively coupled to a plurality of client user interfaces 502. The client user interfaces 502 may include web browsers, smart phone apps, workstation consoles, widgets, APIs, and/or the like. User inputs received from the client user interfaces 502 may be processed by the logic interpreter 510 according to the executable routine 506, and the result may be stored in the live production database 512. As shown in block diagram 500, a plurality of executable routines may be executed by the same logic interpreter 510. Although not shown explicitly, it will be understood that multiple logic interpreters 510 may operate between the client user interfaces 502 and the live production database 512. Therefore, the logic interpreter 510 may be configured to receive inputs from the user interface during live use, process inputs according to an executable routine to generate a result set, and provide the result set to the database 512 for storage.

Even though the executable routine 506 was verified by human and/or computer methodologies before being deployed, it may be very difficult to explore every execution pathway in an executable routine 506 in practice. Therefore, the executable routine 506 may still generate some errors during execution. The failure detection unit 508 can monitor the operation of the logic interpreter 510 to detect and/or log failures for each type of executable routine in operation. Typically, the failure detection unit 508 may monitor runtime errors that result in an execution error as the executable routine 506 is running In some cases, the failure detection unit may also log result sets against inputs for periodic review by an administrator. Although the failure detection unit 508 typically will not be equipped to detect data calculation/transformation errors, these operations may be periodically reviewed by administrators to ensure that the data is being correctly manipulated by the executable routine 506.

The failure detection unit may detect a failure in one or more of the executable routines. However, a certain failure rate may be acceptable within the ESS product 504. For example, an intermittent failure that occurs periodically may be allowed to continue because it would take more time and resources to remove the executable routine 506 than the problems caused by allowing continue operating. The failure detection unit 508 may monitor failures until a certain failure rate is detected. At this point, the failures may become numerous enough that they may threaten the efficiency of the overall ESS product 504. In other cases, the failure detection unit 508 may detect a threshold number of failures over time. In other cases, the failure detection unit 508 may detect failures based on their severity, i.e. a small number of severe failures may be tolerated, while a larger number of minor failures may be tolerated.

If the failure detection unit 508 determines that enough failures have occurred to warrant disabling the executable routine 506, a logic interpreter 510 may disable the executable routine 506. In some embodiments, a copy of the input object(s) may be saved in memory outside of the database 512 along with a debug stack or other type of error log associated with the failed executions. An indication may be sent back to the administrator user interface that the business logic they designed has failed and has been removed from deployment. The error logs, input objects, and resulting outputs may be provided to the administrator user interface in order to debug, revise, and redeploy the business logic. In some cases, this information may be stored in an in-memory cache to avoid burdening the database 512.

In some embodiments, the various modules and systems in FIGS. 3-4 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

Figure 6:
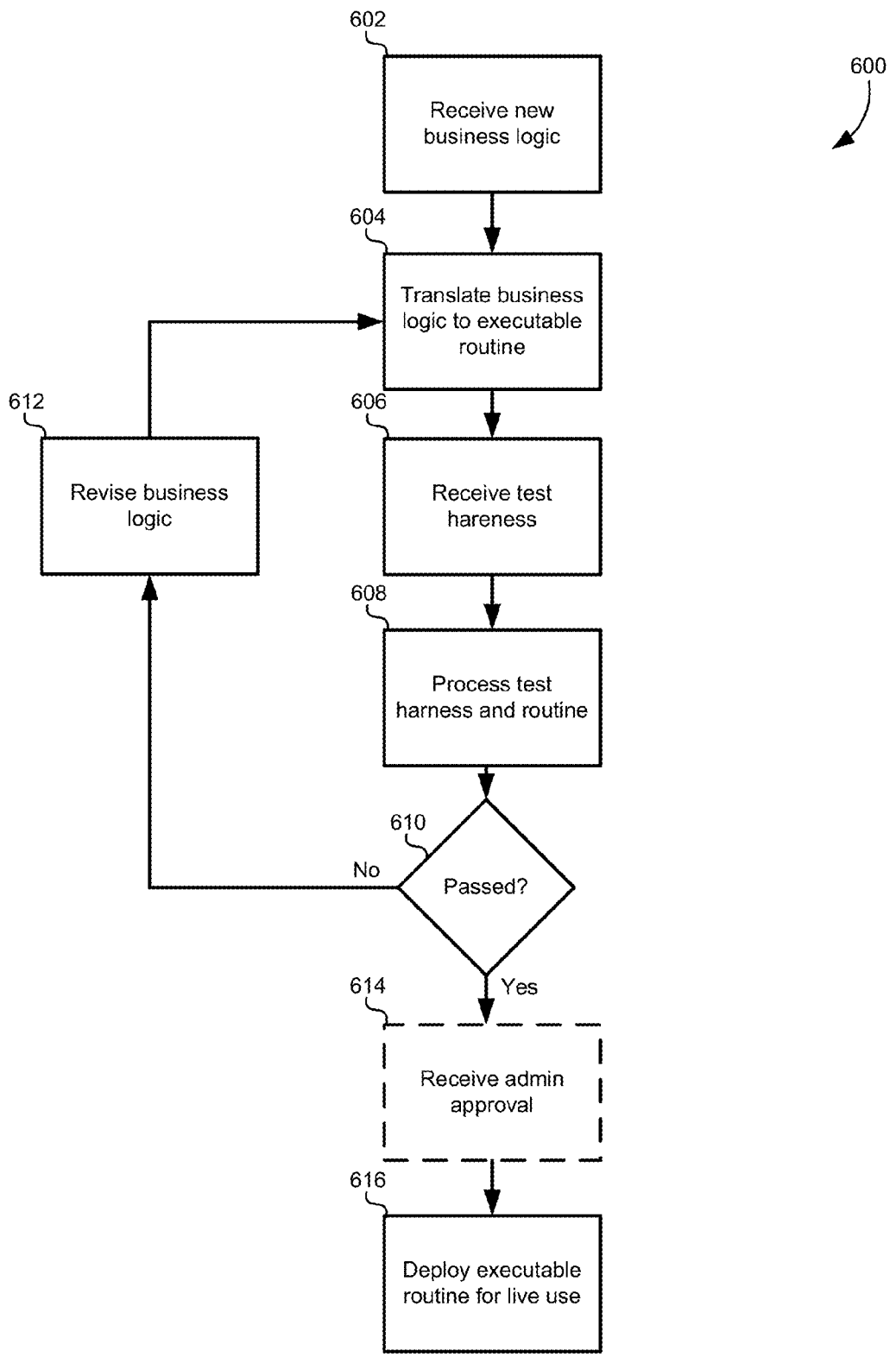
FIG. 6 illustrates a flowchart of a method for validating and deploying business logic, according to one embodiment.

FIG. 6 illustrates a flowchart 600 of a method for validating and deploying business logic, according to one embodiment. The method may include receiving new business logic (602). The business logic may be provided by a graphical user interface, and may be in the form of a flowchart, a directed graph, or logical/sequential statements. The method may also include translating the business logic into an executable routine (604). The executable routine may be compiled in such a way that pointers do not need to be resolved, memory locations are relative to the file location, and may thereby be compatible with memory-mapped operating systems to lower execution overhead.

The method may also include receiving a test harness (606). The test harness may include one or more sets of inputs along with corresponding expected result sets. The test harness may be configured to exercise a large percentage of the possible execution paths of the executable routine. The method may further include processing the test harness using the executable routine (608). Executable routine may use the test harness input sets to generate corresponding result sets. Next, the expected result sets may be compared to the generated result sets to determine whether the business logic should be deployed according to the automated computerized testing environment (610). If the test fails, the business logic may be revised (612) and recompiled in order to retest for deployment (604).

If the business logic passes the automated computerized test, some embodiments may also include an option for an administrator to provide a human approval (614). In some embodiments, both the human approval and the computerized approval may be required for deployment. If the necessary approvals are provided, the executable routine may be deployed for live use with the database in an ESS product (616).

Figure 7:
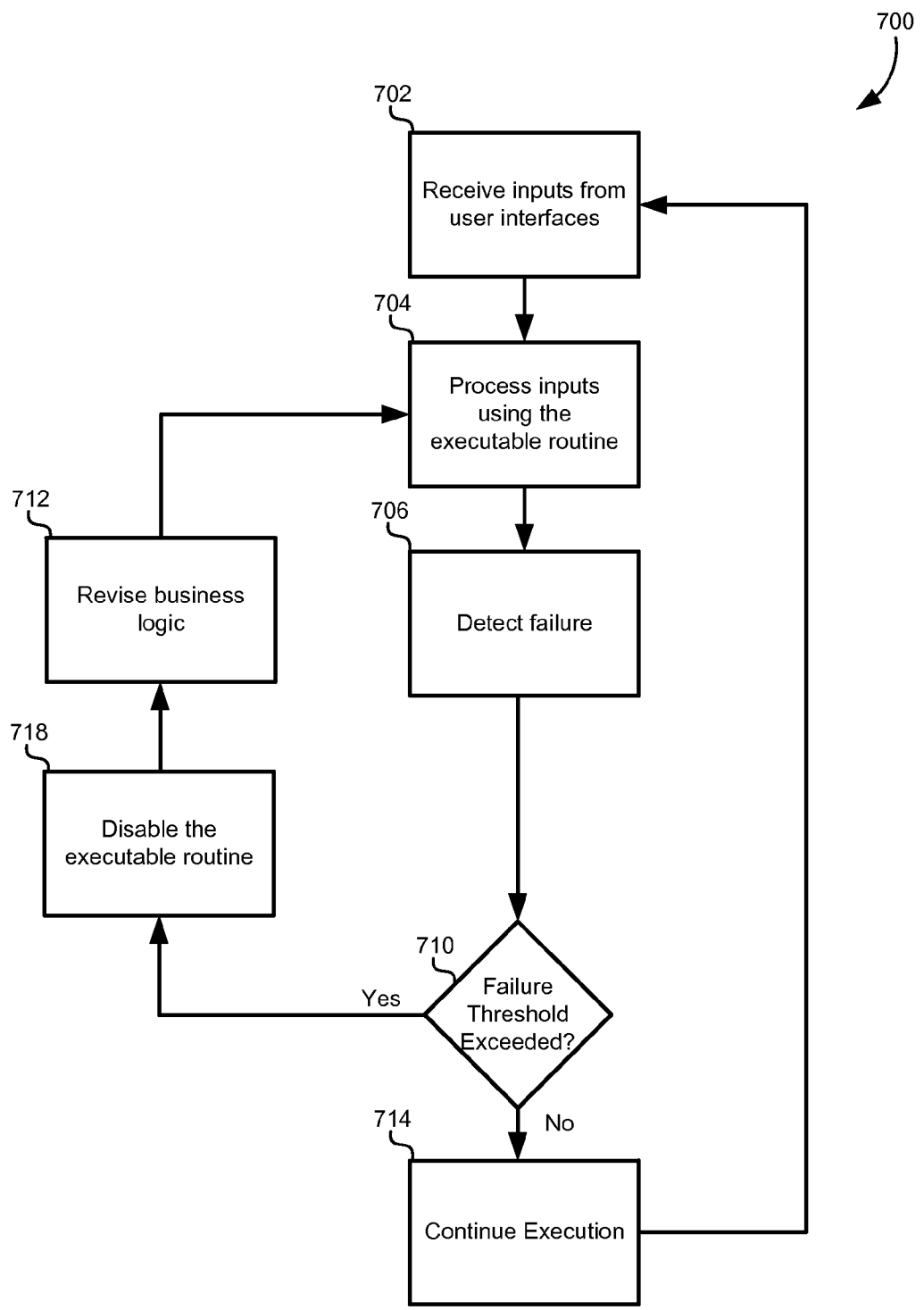
FIG. 7 illustrates a flowchart of a method for executing and monitoring business logic, according to one embodiment.

FIG. 7 illustrates a flowchart 700 of a method for executing and monitoring business logic, according to one embodiment. The method of flowchart 700 may be executed by an ESS product using an executable routine representing business logic that has previously been verified as described above. The method may include receiving inputs from user interfaces (702). Interfaces may include apps, consoles, web forms, and/or the like. The method may additionally include processing the input using the executable routine (704). Many separate processes may process inputs using the same executable routine. The method may further include detecting a failure during execution (706). At this point, subsequent failures may be recorded and compared to a failure threshold. If the failure threshold is exceeded (710) the executable routine may be disabled (718). Subsequently, the business logic may be revised (712) and redeployed the system to again process user inputs. If the detected failures do not exceed the failure threshold, the business logic may continue executing as normal (714).

It should be appreciated that the specific steps illustrated in FIGS. 6-7 provide particular methods of managing business logic according to various embodiments. Other sequences of steps may also be performed according to alternative embodiments. For example, alternative embodiments of the present invention may perform the steps outlined above in a different order. Moreover, the individual steps illustrated in FIGS. 6-7 may include multiple sub-steps that may be performed in various sequences as appropriate to the individual step. Furthermore, additional steps may be added or removed depending on the particular applications. One of ordinary skill in the art would recognize many variations, modifications, and alternatives.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of implementing and validating business logic in an Enterprise Software System for deployment, the method comprising:
   receiving the business logic comprising functional algorithms that define one or more information exchanges between a database and a user interface;
   translating the business logic into an executable routine;
   providing the executable routine to a logic interpreter, wherein the logic interpreter is configured to:
      receive inputs from the user interface during live use;
      process the inputs according to the executable routine to generate a result set; and
      provide the result set to the database for storage;
   receiving a test harness comprising a plurality of input sets and a corresponding plurality of expected result sets;
   processing, by the logic interpreter, each of the plurality of input sets according to the executable routine to generate a plurality of result sets; and
   generating an automatic determination as to whether the executable routine should be deployed for live use based on the plurality of result sets and the plurality of expected result sets.

2. The method of claim 1 further comprising receiving an administrator input authorizing the executable routine to be deployed for live use.

3. The method of claim 2 further comprising deploying the executable routine for live use based on both the administrator input and the automatic determination.

4. The method of claim 1 further comprising:
   deploying the executable routine;
   monitoring the performance of the executable routine; and
   disabling the executable routine if a set of failure criteria are met.

5. The method of claim 4 wherein the set of failure criteria comprises a threshold number of detected failures within a predetermined time interval.

6. The method of claim 1 further comprising converting the business logic to a directed graph before the business logic is converted into the executable routine.

7. The method of claim 6 further comprising detecting a cycle in the directed graph and displaying the cycle in the context of the directed graph through a display device.

8. The method of claim 1 wherein the business logic interpreter is implemented on a computer system that is physically distinct from the database and the user interface.

9. The method of claim 1 wherein the Enterprise Software System is designed by a first entity, the Enterprise Software System is operated by a second entity, and the business logic is provided by the second entity.

10. A computer-readable memory comprising a sequence of instructions which, when executed by one or more processors, causes the one or more processors to implement and validate business logic in an Enterprise Software System for deployment by:
   receiving the business logic comprising functional algorithms that define one or more information exchanges between a database and a user interface;
   translating the business logic into an executable routine;
   providing the executable routine to a logic interpreter, wherein the logic interpreter is configured to:
      receive inputs from the user interface during live use;
      process the inputs according to the executable routine to generate a result set; and provide the result set to the database for storage;
receiving a test harness comprising a plurality of input sets and a corresponding plurality of expected result sets;
processing, by the logic interpreter, each of the plurality of input sets according to the executable routine to generate a plurality of result sets; and
generating an automatic determination as to whether the executable routine should be deployed for live use based on the plurality of result sets and the plurality of expected result sets.

11. The computer-readable memory according to claim 10 wherein the instructions further cause the one or more processors to implement and validate business logic in an Enterprise Software System for deployment by receiving an administrator input authorizing the executable routine to be deployed for live use.

12. The computer-readable memory according to claim 11 wherein the instructions further cause the one or more processors to implement and validate business logic in an Enterprise Software System for deployment by deploying the executable routine for live use based on both the administrator input and the automatic determination.

13. The computer-readable memory according to claim 11 wherein the instructions further cause the one or more processors to implement and validate business logic in an Enterprise Software System for deployment by:
deploying the executable routine;
monitoring the performance of the executable routine; and
disabling the executable routine if a set of failure criteria are met.

14. The computer-readable memory according to claim 10 wherein the set of failure criteria comprises a threshold number of detected failures within a predetermined time interval.

15. The computer-readable memory according to claim 10 wherein the business logic interpreter is implemented on a computer system that is physically distinct from the database and the user interface.

16. The computer-readable memory according to claim 10 wherein the Enterprise Software System is designed by a first entity, the Enterprise Software System is operated by a second entity, and the business logic is provided by the second entity.

17. A system comprising:
one or more processors; and
a memory communicatively coupled with and readable by the one or more processors and comprising a sequence of instructions which, when executed by the one or more processors, cause the one or more processors to implement and validate business logic in an Enterprise Software System for deployment by:
receiving the business logic comprising functional algorithms that define one or more information exchanges between a database and a user interface;
translating the business logic into an executable routine;
providing the executable routine to a logic interpreter, wherein the logic interpreter is configured to:
receive inputs from the user interface during live use;
process the inputs according to the executable routine to generate a result set; and
provide the result set to the database for storage;
receiving a test harness comprising a plurality of input sets and a corresponding plurality of expected result sets;
processing, by the logic interpreter, each of the plurality of input sets according to the executable routine to generate a plurality of result sets; and
generating an automatic determination as to whether the executable routine should be deployed for live use based on the plurality of result sets and the plurality of expected result sets.

18. The system of claim 17 wherein the instructions further cause the one or more processors to implement and validate business logic in an Enterprise Software System for deployment by:
receiving an administrator input authorizing the executable routine to be deployed for live use; and
deploying the executable routine for live use based on both the administrator input and the automatic determination.

19. The system of claim 17 wherein the instructions further cause the one or more processors to implement and validate business logic in an Enterprise Software System for deployment by:
converting the business logic to a directed graph before the business logic is converted into the executable routine; and
detecting a cycle in the directed graph and displaying the cycle in the context of the directed graph through a display device.

20. The system of claim 17 wherein the instructions further cause the one or more processors to implement and validate business logic in an Enterprise Software System for deployment by:
deploying the executable routine;
monitoring the performance of the executable routine; and
disabling the executable routine if a set of failure criteria are met, wherein the set of failure criteria comprises a threshold number of detected failures within a predetermined time interval.

* * * * *

UNITED STATES PATENT AND TRADEMARK OFFICE
CERTIFICATE OF CORRECTION

PATENT NO. : 9,122,804 B2  
APPLICATION NO. : 13/895183  
DATED : September 1, 2015  
INVENTOR(S) : Rhoads Page 1 of 1

It is certified that error appears in the above-identified patent and that said Letters Patent is hereby corrected as shown below:

On the title page, item [73], delete "Oracle Internation Corporation," and insert -- Oracle International Corporation, --, therefor.

On the title page, item [56], column 2, line 2, delete "deployement," and insert -- deployment, --, therefor.

In the drawings,

Sheet 6 of 7, in FIG. 6, under reference numeral 606, line 2, delete "hareness" and insert -- harness --, therefor.

In the specification,

Column 7, line 65, delete "utiltize" and insert -- utilize --, therefor.

Column 8, line 38, after "user." delete "Him".

Column 9, lines 14-15, delete "running" and insert -- running. --, therefor.

Column 12, line 7, delete "running" and insert -- running. --, therefor.

Signed and Sealed this  
Seventh Day of June, 2016

Michelle K. Lee  
*Director of the United States Patent and Trademark Office*